United States Patent
Chakra et al.

(10) Patent No.: US 10,609,056 B2
(45) Date of Patent: Mar. 31, 2020

(54) ONLINE PRESENCE INTERACTION USING A BEHAVIORAL CERTIFICATE

(71) Applicant: International Business Machines Corporation, Armonk, NY (US)

(72) Inventors: Al Chakra, Apex, NC (US); Liam Harpur, Dublin (IE); Sumit Patel, Round Rock, TX (US); John Rice, Waterford (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 115 days.

(21) Appl. No.: 15/606,504

(22) Filed: May 26, 2017

(65) Prior Publication Data
US 2018/0343273 A1 Nov. 29, 2018

(51) Int. Cl.
*H04L 29/06* (2006.01)
*G06F 21/57* (2013.01)

(52) U.S. Cl.
CPC ........ *H04L 63/1425* (2013.01); *G06F 21/577* (2013.01); *H04L 63/20* (2013.01); *G06F 2221/2119* (2013.01)

(58) Field of Classification Search
CPC ................................... H04L 63/1425
USPC ........................................... 726/4
See application file for complete search history.

(56) References Cited

U.S. PATENT DOCUMENTS

| | | | |
|---|---|---|---|
| 8,397,063 B2 | 3/2013 | DiCrescenzo | |
| 8,615,514 B1 | 12/2013 | Fernandez et al. | |
| 9,081,940 B2 | 7/2015 | Trevor et al. | |
| 9,497,220 B2* | 11/2016 | Cardamore | H04L 63/20 |
| 9,521,147 B2 | 12/2016 | Barton et al. | |
| 2004/0049534 A1 | 3/2004 | Nickerson et al. | |
| 2004/0176992 A1 | 9/2004 | Santos et al. | |
| 2010/0122080 A1* | 5/2010 | Lee | H04L 63/0823 713/156 |
| 2011/0055562 A1 | 3/2011 | Adelman et al. | |
| 2011/0119154 A1* | 5/2011 | Lombardi | G06Q 30/04 705/26.41 |

(Continued)

OTHER PUBLICATIONS

Al Chakra, et al.,"Online Presence Interaction Using a Behavioral Certificate," U.S. Appl. No. 15/810,404, filed Nov. 13, 2017.

(Continued)

*Primary Examiner* — Longbit Chai
(74) *Attorney, Agent, or Firm* — Cantor Colburn LLP; Teddi Maranzano (57) ABSTRACT

Embodiments include methods, systems and computer program products method for online presence interaction using a behavioral certificate. The computer-implemented method includes monitoring, using a processor, one or more online presence interactions by one or more users. The processor determines whether a behavioral certificate exist for the online presence. The processor cross-references one or more authorized inputs, outputs or actions for the online presence based at least in part on an existence of a behavioral certificate for the online presence. The processor transmits the behavioral certificate, wherein the behavioral certificate advises the one or more users how to interact with the online presence.

11 Claims, 5 Drawing Sheets

(56) References Cited

U.S. PATENT DOCUMENTS

2013/0018957 A1* 1/2013 Parnaby ................ G06Q 10/10
709/204
2016/0087974 A1 3/2016 Wharton
2017/0019393 A1 1/2017 Rajagopal et al.

OTHER PUBLICATIONS

List of IBM Patents or Patent Applications Treated as Related; Date Filed: May 26, 2017, p. 1-2.
White pages "Merchant Ratings FAQs" BizRate, Oct. 30, 2012, p. 1-4.

* cited by examiner

ONLINE PRESENCE INTERACTION USING A BEHAVIORAL CERTIFICATE

BACKGROUND

The present invention relates in general to web browser usage by an individual, and more specifically, to methods, systems and computer program products for generating and using safe browsing certificates based on behavior on a particular web page or a similar web page.

Users often visit websites for a variety of reasons, for example, social networking, conducting banking transactions, online purchases, etc. Users often have to divulge sensitive and/or private information when interacting with these websites, for example, banking details. Accordingly, many users have privacy concerns over such disclosures and a web site owner's ability to collect sensitive and/or private information. Concerns about users interacting on a legitimate webpage also exist since users can be duped into divulging personal information to an unknown party via an illegitimate website. Accordingly, many websites use some form of certification to give the user confidence that the user is interacting with the desired party in a secure manner.

SUMMARY

Embodiments of the invention are directed to a method for online presence interaction using a behavioral certificate. A non-limiting example of the computer-implemented method includes monitoring, using a processor, one or more online presence interactions by one or more users. The processor determines whether a behavioral certificate exists for the online presence. The processor cross-references one or more authorized inputs, outputs or actions for the online presence based at least in part on an existence of a behavioral certificate for the online presence. The processor transmits the behavioral certificate, wherein the behavioral certificate advises the one or more users how to interact with the online presence.

Embodiments of the invention are directed to a computer program product that can include a storage medium readable by a processing circuit that can store instructions for execution by the processing circuit for performing a method for online presence interaction using a behavioral certificate. The method includes monitoring one or more online presence interactions by one or more users. The processor determines whether a behavioral certificate exists for the online presence. The processor cross-references one or more authorized inputs, outputs or actions for the online presence based at least in part on an existence of a behavioral certificate for the online presence. The processor transmits the behavioral certificate, wherein the behavioral certificate advises the one or more users how to interact with the online presence.

Embodiments of the invention are directed to a system for online presence interaction using a behavioral certificate. The system can include a processor in communication with one or more types of memory. The processor can be configured to monitor one or more online presence interactions by one or more users. The processor can be configured to determine whether a behavioral certificate exists for the online presence. The processor can be configured to cross-reference one or more authorized inputs, outputs or actions for the online presence based at least in part on an existence of a behavioral certificate for the online presence. The processor can be configured to transmit the behavioral certificate, wherein the behavioral certificate advises the one or more users how to interact with the online presence.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The forgoing and other features, and advantages of the disclosure are apparent from the following detailed description taken in conjunction with the accompanying drawings in which.

The diagrams depicted herein are illustrative. There can be many variations to the diagram or the operations described therein without departing from the spirit of the invention. For instance, the actions can be performed in a differing order or actions can be added, deleted or modified. In addition, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments of the invention, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, embodiments of the invention are related in general to user interaction with a company's online presence (i.e., websites, mobile apps, cloud platforms, etc.). To ensure consumer confidence when interacting a company's online presence, the company often uses safe browsing certificates.

One type of certification, which facilitates safe web browsing, is a TRUSTe certificate. TRUSTe's privacy certifications provide consumer protections and establish privacy standards for consumers. Each certification has certification standards applied against the company's online presence, customer and employee data management practices, and/or applicable regulatory frameworks, for example, the Children's Online Privacy Protection Act (COPPA). Obtaining a TRUSTe certification is time consuming and expensive. While providing consumer confidence for a company's online presence is extremely important, proving such consumer confidence in a more efficient and less costly manner is desirable.

Turning now to an overview of the aspects of the invention, one or more embodiments of the invention address the above-described shortcomings of the prior art by generating a behavioral certificate based on aggregated feedback/measurement of one or more visitors interactions with an online presence in order to create a crowdsourced certificate that indicates acceptable behaviors for the online presence. The new behavioral certificate can then be used to dictate allowable interactions (actions, inputs, outputs, etc.) for a given online presence.

The above-described aspects of the invention address the shortcomings of the prior art by using behavioral patterns of users on an online presence, for example, a website or similar type of website (i.e., websites of similar form or functionality, social browsing, e-commerce or the like) to obtain user accepted inputs, outputs, and/or actions for a given webpage. The invention also uses the accumulated behavioral patterns to create a standard usage ledger for cross-referencing user interactions on a website or a website that is similar to a website that can be used to indicate that a website is safe or information requested by a website is valid and/or a norm.

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud computing is an infrastructure comprising a network of interconnected nodes.

Figure 1:
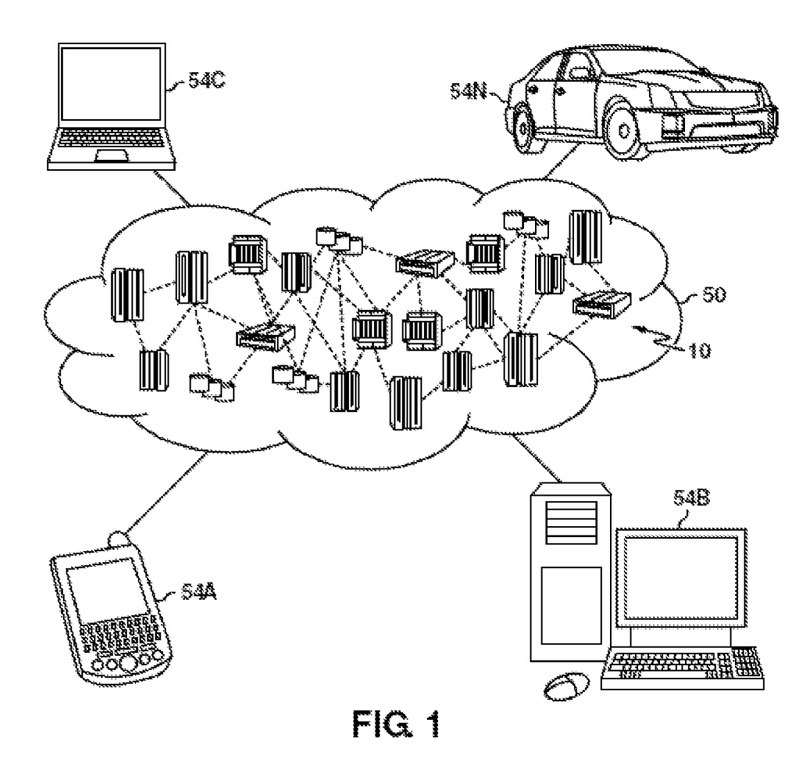
FIG. 1 depicts a cloud computing environment according to one or more embodiments of the present invention.

Referring now to FIG. 1, illustrative cloud computing environment 50 is depicted. As shown, cloud-computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud-computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
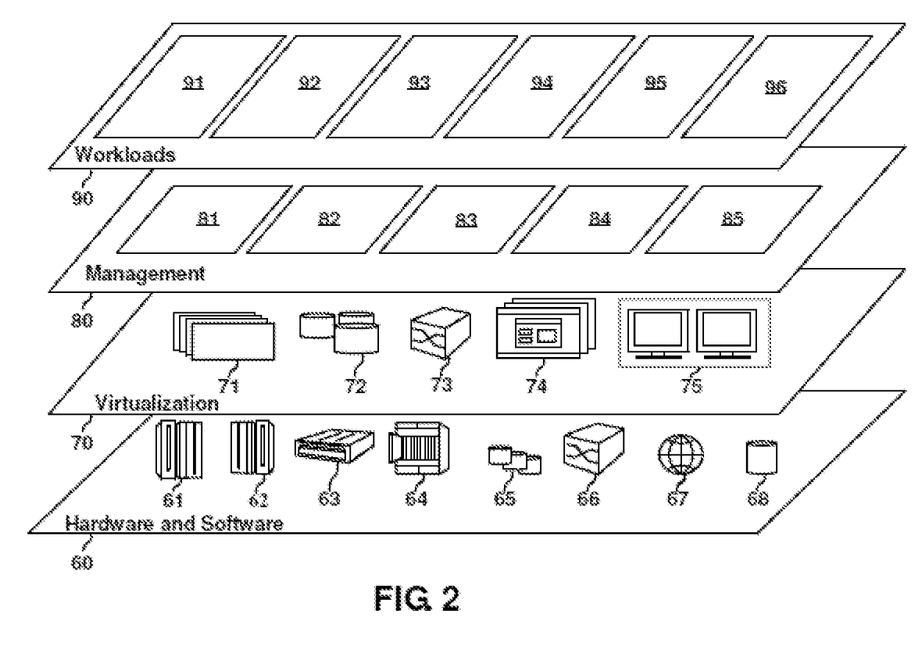
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud-computing environment. Metering and Pricing 82 provide cost tracking as resources are utilized within the cloud-computing environment, and billing or invoicing for consumption of these resources. In one example, these resources may comprise application software licenses. Security provides identity verification for cloud consumers and tasks, as well as protection for data and other resources. User portal 83 provides access to the cloud-computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud-computing environment may be utilized. Examples of workloads and functions that may be provided from this layer include: mapping and navigation 91; software development and lifecycle management 92; virtual classroom education delivery 93; data analytics processing 94; transaction processing 95; and managing content disclosure on social networking sites 96.

Figure 3:
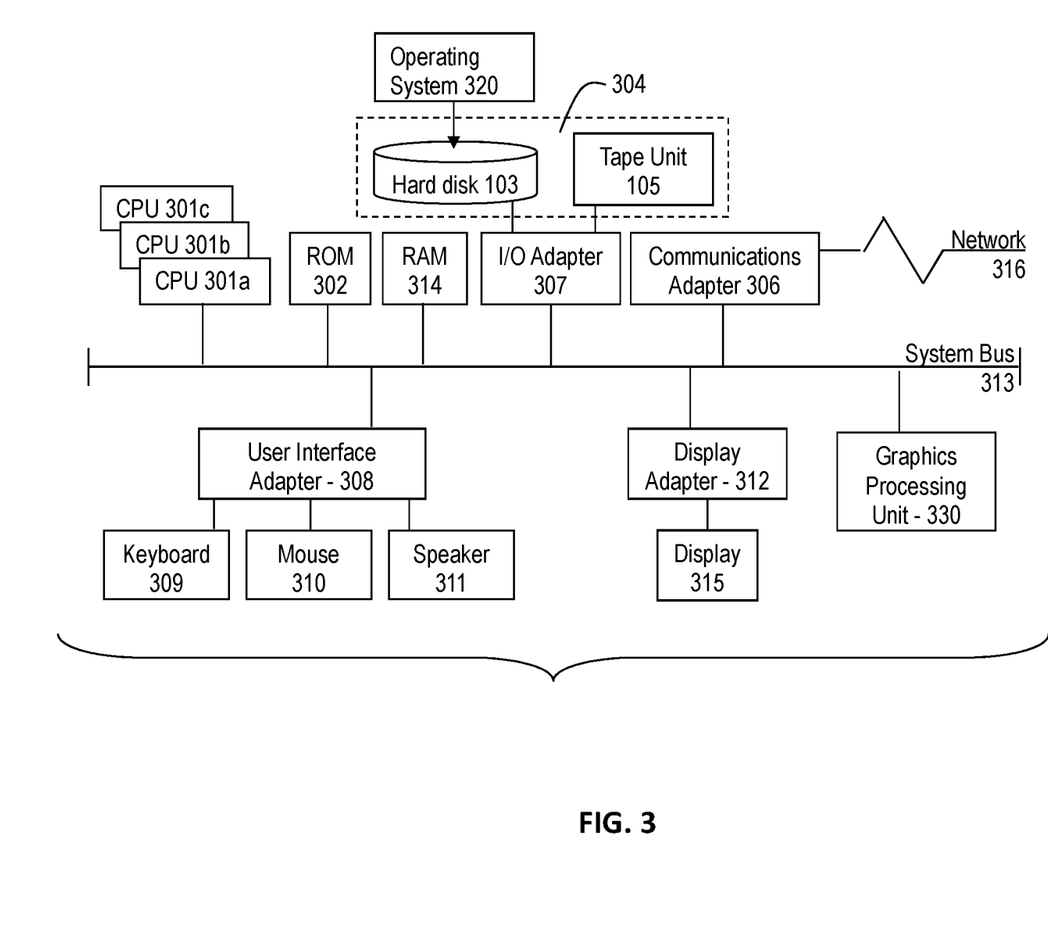
FIG. 3 is a block diagram illustrating one example of a processing system for practice of the teachings herein.

Referring to FIG. 3, there is shown a processing system 300 for implementing the teachings of the present disclosure according to one or more embodiments of the invention described herein. The system 300 has one or more central processing units (processors) 301a, 301b, 301c, etc. (collectively or generically referred to as processor(s) 301). In one embodiment, each processor 301 may include a reduced instruction set computer (RISC) microprocessor. Processors 301 are coupled to system memory 314 and various other components via a system bus 313. Read only memory (ROM) 302 is coupled to the system bus 313 and may include a basic input/output system (BIOS), which controls certain basic functions of system 300.

FIG. 3 further depicts an input/output (I/O) adapter 307 and a communications adapter 306 coupled to the system bus 313. I/O adapter 307 may be a small computer system interface (SCSI) adapter that communicates with a hard disk 303 and/or tape storage drive 305 or any other similar component. I/O adapter 307, hard disk 303, and tape storage device 305 are collectively referred to herein as mass storage 304. Operating system 320 for execution on the processing system 300 may be stored in mass storage 304. A communications adapter 306 interconnects bus 313 with an outside network 316 enabling data processing system 300 to communicate with other such systems. A screen (e.g., a display monitor) 315 is connected to system bus 313 by display adapter 312, which may include a graphics adapter to improve the performance of graphics intensive applications and a video controller. In one embodiment, adapters 307, 306, and 312 may be connected to one or more I/O busses that are connected to system bus 313 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 313 via user interface adapter 308 and display adapter 312. A keyboard 309, mouse 310, and speaker 311 all interconnect to bus 313 via user interface adapter 308, which may include, for example, a Super I/O chip integrating multiple device adapters into a single integrated circuit.

In exemplary embodiments of the invention, the processing system 300 includes a graphics-processing unit 330. Graphics processing unit 330 is a specialized electronic circuit designed to manipulate and alter memory to accelerate the creation of images in a frame buffer intended for output to a display. In general, graphics-processing unit 330 is very efficient at manipulating computer graphics and image processing, and has a highly parallel structure that makes it more effective than general-purpose CPUs for algorithms where processing of large blocks of data is done in parallel.

Thus, as configured in FIG. 3, the processing system 300 includes processing capability in the form of processors 301, storage capability including system memory 314 and mass storage 304, input means such as keyboard 309 and mouse 310, and output capability including speaker 311 and display 315. In one embodiment, a portion of system memory 314 and mass storage 304 collectively store an operating system such as the AIX® operating system from IBM Corporation to coordinate the functions of the various components shown in FIG. 3.

Figure 4:
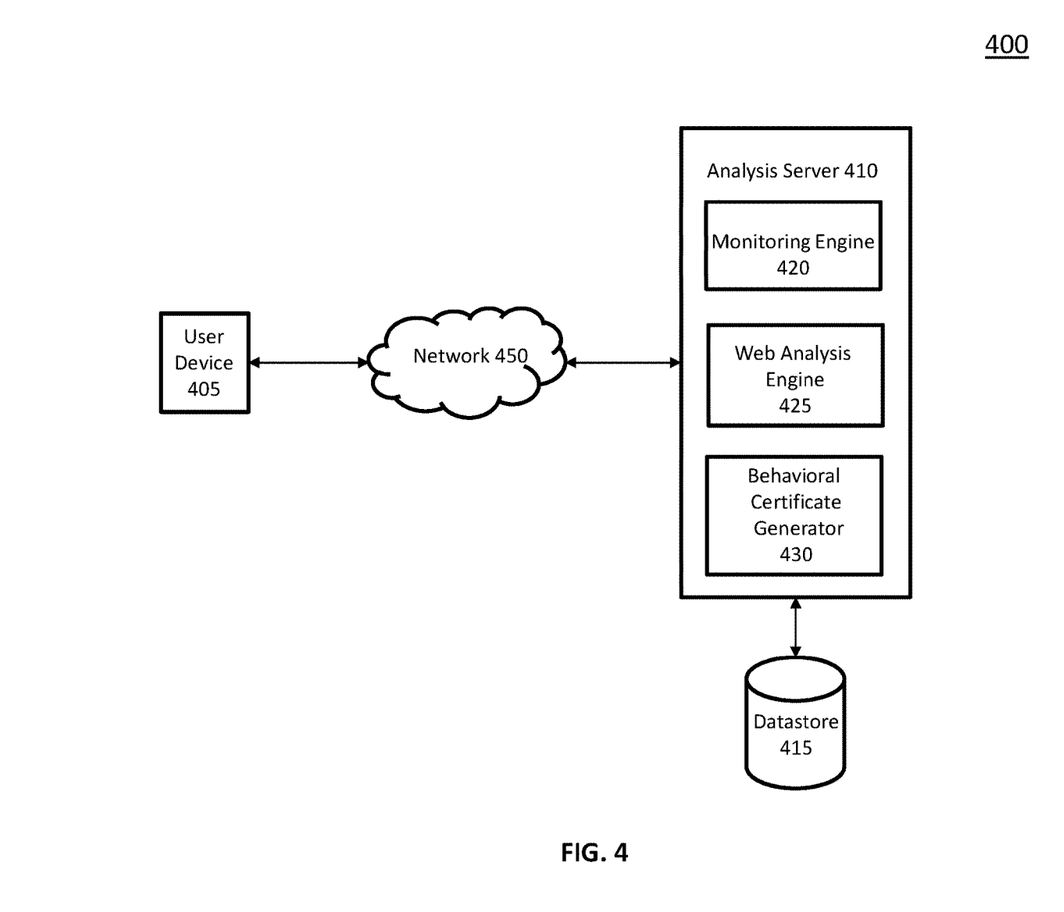
FIG. 4 is a block diagram illustrating a computing system according to one or more embodiments of the present invention.

Referring now to FIG. 4, there is illustrated a computing system 400 in accordance with one or more embodiments of the invention. As illustrated, the computing system 400 can include but is not limited to, a user device 405, an analysis server 410 and a datastore 415 connected over one or more networks, for example, network 450. The user device 405 and analysis server 410 can utilize processing system 300 (FIG. 3). In some embodiments of the invention, the analysis server 410 can include a monitoring engine 420, web analysis engine 425 and a behavioral certificate generator 430.

In some embodiments of the invention, the user device 405 can be any type of computing device, such as a computer, laptop, tablet, smartphone, wearable computing device, server, etc. The user device 405 can include one or more applications, such as a web browser that can communicate with the analysis server 410 over one or more networks 450.

The network(s) 450 can include, but are not limited to, any one or a combination of different types of suitable communications networks such as, for example, cable networks, public networks (e.g., the Internet), private networks, wireless networks, cellular networks, or any other suitable private and/or public networks. Further, the network(s) 450 can have any suitable communication range associated therewith and can include, for example, global networks (e.g., the Internet), metropolitan area networks (MANs), wide area networks (WANs), local area networks (LANs), or personal area networks (PANs). In addition, the network(s) 450 can include any type of medium over which network traffic can be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

In some embodiments, the analysis server 410 can be any type of computing device with network access, such as a computer, laptop, server, tablet, smartphone, wearable computing devices, or the like. The analysis server 410 can be part of a cloud-computing environment (FIG. 1) that provides a specific functionality to the user device 405, such as a software-as-a-service functionality.

The monitoring engine 420 can include computer-readable instructions that, in response to execution by the processor(s) 301, cause operations to be performed including monitoring user interactions on a company's online presence (i.e., websites, mobile apps, cloud platforms) over user devices 405. The monitoring engine 420 can facilitate the transmission of user activity and interactions to the web analysis engine 425. The monitoring engine 420 can also facilitate a transmission of data to the datastore 415.

The datastore 415 can store data for different aspects of behavioral patterns of a plurality of user interactions and usage associated with a plurality of online presences. These behavioral patterns can be stored, for example, in a ledger format. The ledger can store interactions deemed standard and/or non-standard for a given online presence or type of online presence, i.e., a standard usage ledger. The ledger can store inputs received from, for example, directory access protocols (Directory Access Protocol (DAP) or Lightweight Directory Access Protocol (LDAP), or social media to determine a user profile and a circle of associated users.

The web analysis engine 425 may include computer-readable instructions that, in response to execution by the processor(s) 101, cause operations to be performed including receiving data related to user interactions on an online presence from the monitoring engine 420, which was received from a user device 405. Examples of user interactions can include, but are not limited to, inputs, outputs, actions, form entry, or the like. The web analysis engine 425 can analyze one or more interactions associated with a webpage to determine the flow of the users, what forms; inputs; text; numeric inputs; or other actions, users employ on a given online presence. When one or more users browse content online, the web analysis engine 425 can cross-reference user profile information, for example, job role, demographics, social circles, etc., and based on the user profile, the web analysis engine 425 can instruct the behavioral certificate generator 430 to generate a behavioral certificate based on aggregated feedback of the users. The web analysis engine 425 can continually analyze user interactions to determine behavioral patterns of acceptable and/or unacceptable interactions for a website or website type, which can be stored in the standard usage ledger in datastore 415.

For example, if a behavioral certificate does not exist for a website being traversed by a user, or a website deemed similar to the website being traversed by the user, the web analysis engine 425 can determine that there have been several users having similar user profiles that have navigated to the same or a similar website and have avoided certain actions, navigations or pop-ups. Based on these user interactions (aggregated feedback), the web analysis engine 425 can instruct the behavioral certificate generator 430 to generate a behavioral certificate that will disable/enable functionality on the associated website and/or any website deemed similar.

In some embodiments of the invention, a behavioral certificate for a website or a website deemed similar may already exist. The web analysis engine 425 can obtain the behavioral certificate to be used on the website from, for example, datastore 415. The behavioral certificate can be used to cross-reference the standard usage ledger to obtain a standard usage, i.e., acceptable inputs, outputs, requests for information, privacy settings or any other accepted behavior and actions associated with a given webpage. Accordingly, the behavioral certificate can be loaded on an associated user device 405 and can be used to allow safe interactions on the website based on an aggregated pattern of behavior on the webpage or a webpage of similar type thereby reducing an opportunity to divulge personal or confidential inadvertently due to spoofing or other forms of mimicry.

The behavioral certificate generator 430 may include computer-readable instructions that, in response to execution by the processor(s) 301, cause operations to be performed, including generating a certificate that can be used on a website to indicate and/or dictate safe browsing and behavior. The behavioral certificate can be used to enable or disable/block certain functionality on a given webpage, for example, copy and paste functions, pop-ups, text entry or any other action determined to be dangerous based on aggregated user behavior on a given webpage or webpage of similar type. Dangerous actions can be related to interactions that involve user privacy, i.e., personal data (date of birth, address, social security number), financial details, i.e. banking information (account information (checking, credit card, card verification values (CVV)), security details, i.e., username, passwords, or the like. The behavioral certificate can also include functionality/rules to restrict entry of other confidential information on a webpage or navigation on portions of a webpage, or a webpage in its entirety. The behavioral certificate can be updated by the web analysis engine 425 in real time based on activity from additional users or predetermined thresholds (for example a fixed time interval) or based on significantly changed behavior on the website or a website of similar type.

Accordingly, if a user encounters a mimicked web site that requests information that is not standard information for an original web site, the behavioral certificate for the original website can be used to prevent input of the non-standard information by the user on the mimicked web site. The behavioral certificate can provide a secure and safe environment for user interactions with an online presence.

Figure 5:
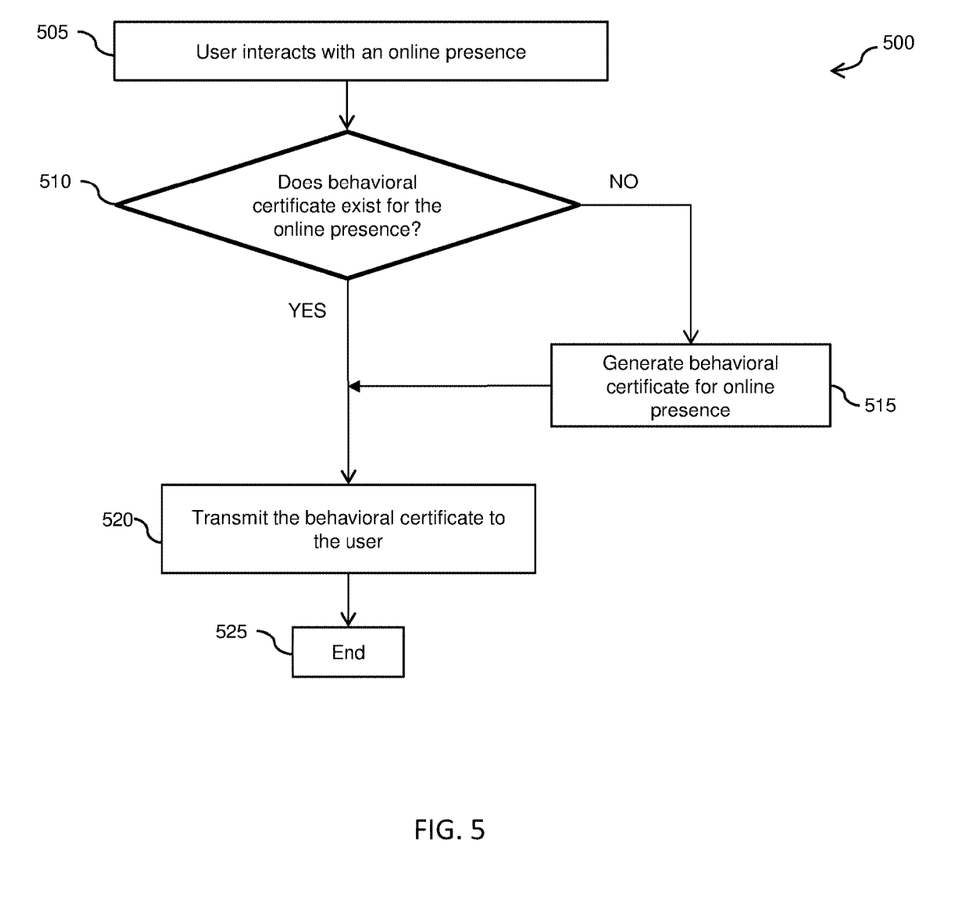
FIG. 5 is a flow diagram of a method for online presence interaction using a behavioral certificate according to one or more embodiments of the present invention.

Now referring to FIG. 5, a flow diagram of a method 500 for interacting with an online presence using a behavioral certificate in accordance with an exemplary and non-limiting embodiment is depicted. At block 505, a user attempts to interact with an online presence using, for example, user device 405, and is monitored by monitoring engine 420 of the analysis server 410. For example, the analysis server 410 can monitor a user navigating a company's retail website or social media application. At block 510, a web analysis engine 425 of the analysis server 410 can determine whether a behavioral certificate exists for the online presence in which the user is interacting or a similar online presence.

Upon a determination by the web analysis engine 425 that a behavioral certificate does not exist for the online presence, at block 515, the analysis server 410 can instruct the behavioral certificate generator 430 to generate a behavioral certificate for the online presence. The new behavioral certificate can be based at least on aggregated data associated with behavioral patterns from webpage and/or other online presence interactions of similar webpages or webpage types, which can be stored in datastore 415. For example, users interacting on a similar webpage may have avoided certain actions or pop-ups on the webpage. Accordingly, the generated behavioral certificate can take into account the behavioral patterns of users on the similar webpage to disable certain actions or pop-ups on the online presence visited by the user.

Upon a determination by the web analysis engine 425 that a behavioral certificate exists for the online presence, at block 520, the analysis server 410 can transmit the behavioral certificate to the user to be used when interacting with the online presence over network 250. The behavioral certificate can indicate acceptable patterns of behaviors for a given web site by cross-referencing associated authorized actions, inputs and/or outputs for the website that can be stored in datastore 415. At block 525, method 500 ends.

Accordingly, the authorized actions, inputs and outputs for an online presence can be aggregated to produce a behavioral certificate that can be used designate a deployable security pattern for similar websites. For example, on social browsing websites X, Y, and Z, the web analysis engine 425 can determine that users do not perform actions A, B, and C. This behavioral pattern can be applicable to websites with similar actions, and a behavioral certificate can be generated blocking action A, B, and C, on websites X, Y, and Z, and social browsing websites similar to X, Y, and Z.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed:

1. A computer program product embodied in a non-transitory computer readable storage medium having program instructions stored therewith, the program instructions readable by a processing circuit to cause the processing circuit to perform a method comprising:
    monitoring one or more online presence interactions by one or more users;
    determining whether a behavioral certificate exists for the online presence;
    cross-referencing one or more authorized inputs, outputs or actions for the online presence based at least in part on an existence of a behavioral certificate for the online presence; and
    transmitting the behavioral certificate, wherein the behavioral certificate disables certain functionality of the online presence, wherein the certain functionality of the online presence include copy and paste functions of the online presence.

2. The computer program product of claim 1, wherein the method further comprises:
    generating one or more behavioral certificates for an online presence based at least in part on a behavioral certificate not existing for the online presence.

3. The computer program product of claim 1, wherein the online presence comprises one or more websites, one or more mobile applications, or one or more cloud-computing platforms.

4. The computer program product of claim 1, wherein the behavioral certificate is updated in real-time based on a fixed time interval or a change to behavioral patterns of users interacting with the online presence.

5. The computer program product of claim 1, wherein the behavioral certificate advises a user with regard to inputting privacy information or financial information.

6. The computer program product of claim 1, wherein the certain functionality of the online presence further include a pop-up of the online presence.

7. The computer program product of claim 1, wherein the certain functionality of the online presence further includes text entry in the online presence.

8. A computer system, comprising:
a hardware processor in communication with one or more types of memory, the processor configured to:
monitor one or more online presence interactions by one or more users;
determine whether a behavioral certificate exists for the online presence;
cross-reference one or more authorized inputs, outputs or actions for the online presence based at least in part on an existence of a behavioral certificate for the online presence; and
transmit the behavioral certificate, wherein the behavioral certificate disables certain functionality of the online presence, wherein the certain functionality of the online presence include copy and paste functions of the online presence.

9. The computer system of claim 8, wherein the processor is further configured to:
generate one or more behavioral certificates for an online presence based at least in part on a behavioral certificate not existing for the online presence.

10. The computer system of claim 8, wherein the online presence comprises one or more websites, one or more mobile applications, or one or more cloud-computing platforms.

11. The computer system of claim 8, wherein the behavioral certificate is updated in real-time based on a fixed time interval or a change to behavioral patterns of users interacting with the online presence.

\* \* \* \* \*